United States Patent
Popp (10) Patent No.: US 9,804,335 B2
(45) Date of Patent: Oct. 31, 2017

(54) MULTICHANNEL FIBER OPTIC ROTARY JOINT (FORJ) HAVING AN ACHROMATIC METASURFACE

(71) Applicant: Schleifring und Apparatebau GmbH, Fürstenfeldbruck (DE)

(72) Inventor: Gregor Popp, München (DE)

(73) Assignee: SCHLEIFRING UND APPARATEBAU GMBH, Fürstenfeldbruck (DE)

(*) Notice: Subject to any disclaimer, the term of this patent is extended or adjusted under 35 U.S.C. 154(b) by 0 days.

(21) Appl. No.: 15/373,962

(22) Filed: Dec. 9, 2016

(65) Prior Publication Data
US 2017/0176689 A1 Jun. 22, 2017

(30) Foreign Application Priority Data
Dec. 17, 2015 (EP) .................... 15200943

(51) Int. Cl.
G02B 6/36 (2006.01)
G02B 6/34 (2006.01)
G02B 1/00 (2006.01)
G02B 27/30 (2006.01)

(52) U.S. Cl.
CPC ........... *G02B 6/3604* (2013.01); *G02B 1/002* (2013.01); *G02B 6/34* (2013.01); *G02B 27/30* (2013.01)

(58) Field of Classification Search
CPC ...... G02B 6/3604; G02B 27/30; G02B 1/002; G02B 6/34
See application file for complete search history.

(56) References Cited

U.S. PATENT DOCUMENTS

| 5,442,721 | A | 8/1995 | Ames |
| 5,568,578 | A | 10/1996 | Ames |
| 6,301,405 | B1 | 10/2001 | Keil |
| 7,373,041 | B2 * | 5/2008 | Popp ................... G02B 6/3604 385/26 |
| 7,734,130 | B2 * | 6/2010 | Popp ................... G02B 6/2713 385/147 |

(Continued)

FOREIGN PATENT DOCUMENTS

| EP | 2104875 A1 | 9/2009 |
| EP | 2 385 403 A2 | 11/2011 |
| WO | 01/98801 A3 | 12/2001 |

OTHER PUBLICATIONS

Aieta et al, "Multiwavelength Achromatic Metasurfaces by Dispersive Phase Compensation", pp. 1-15.*

(Continued)

*Primary Examiner* — John M Bedtelyon
(74) *Attorney, Agent, or Firm* — Yakov S. Sidorin; Quarles & Brady LLP (57) ABSTRACT

A Multichannel Fiber Optic Rotary Joint (FORJ) has a Dove prism as a derotating optical element, wherein the Dove prism has a multiwavelength achromatic metasurface coating on the input and output face. Such a Multichannel FORJ has the advantage that its transmission properties include consistently low attenuation over a rotation angle and a high-return loss over a broad wavelength range, e.g. the whole frequency band used for telecommunications. A method for fabricating the same.

19 Claims, 6 Drawing Sheets

(56) References Cited

U.S. PATENT DOCUMENTS

| | | | | |
|---|---|---|---|---|
| 7,936,954 B2* | 5/2011 | Popp | ......................... | G02B 5/04 359/580 |
| 7,965,943 B2* | 6/2011 | Popp | ................... | G02B 6/3604 385/25 |
| 2005/0036735 A1* | 2/2005 | Oosterhuis | ........... | G02B 6/4428 385/26 |
| 2011/0299811 A1* | 12/2011 | O'Brien | ................... | G02B 6/32 385/26 |
| 2017/0082263 A1* | 3/2017 | Byrnes | ................... | F21V 5/045 |

OTHER PUBLICATIONS

Arabi, A., et al., "Dielectric metasurfaces for complete control of phase and polarization with subwavelength spatial resolution and high transmission," Nature Nanotechnology, vol. 10, Nov. 2015 (pp. 937-944).

* cited by examiner

MULTICHANNEL FIBER OPTIC ROTARY JOINT (FORJ) HAVING AN ACHROMATIC METASURFACE

CROSS-REFERENCE TO RELATED APPLICATIONS

This application claims priority to pending European Patent Application No. 15200943.7 filed on Dec. 17, 2015. The disclosure of the identified European Patent Application is incorporated herein by reference.

BACKGROUND

1. Field of the Invention

The invention relates to an optical rotary joint.

2. Description of Relevant Art

Various transmission systems are known for transmitting optical signals between units that are rotatable relative to each other.

An optical rotary joint for a plurality of channels, having a Dove prism as a derotating element is disclosed in US 2005/0036735. Light from supply light-waveguides is coupled via collimators into a Dove prism, derotated by means of the latter, and fed into leading-away light-waveguides via further collimators. In order to render the arrangement independent from the refractive index of a medium in the surroundings of the Dove prism, the prism is provided with supplementary optical members, which ensure perpendicular light entry. Owing to this perpendicular light entry, no refraction occurs at the transition face. A disadvantage of this is the partial reflection of light at the perpendicular transition face, so that at least a portion of the light is coupled back into the light-waveguide. This results in a relatively small return loss.

Another kind of an optical rotary joint is disclosed in WO 01/98801 A2. This describes a micro-optical system having optical and mechanical components as a one-piece constituent part. With this design a substantially higher packing density of the individual glass fibers can be attained. Once again, the parallel light-entry and light exit faces are of disadvantage, as they cause a relatively small return loss.

It is a disadvantage of the known prior art that relatively strong reflections of the transmitted light arise inside the rotary joint or at the collimators. An improvement can be achieved with vapor-coated intermediate layers, the refractive indices of which lie between the refractive index of the optical components and that of the surroundings. However, with different surrounding media such as air or oil it is also necessary to adapt the intermediate layers.

U.S. Pat. Nos. 6,301,405, 5,442,721 and 5,568,578 disclose FORJs that transmit optical beams through a Dove derotating prism element at one-half the rotation rate of a receive optical fiber bundle, in a parallel fashion that permits, in theory, a larger number of optical fiber paths for a given rotary joint length. However, these FORJs are wavelength-dependent and are not particularly well suited for applications in which the FORJs are subject to external pressure, such as in underwater applications.

Summarizing, a common disadvantage of the prior art is that multichannel FORJ using Dove prisms is that different wavelengths have different angles of deflection which leads to a deterioration of the imaging or transmission properties for broadband light signals.

SUMMARY

The embodiments are structured to implement the idea of overcoming the above mentioned problems of the prior art, in particular to make the transmission properties of a multichannel FORJ independent of wavelength phenomena, at least in a given wavelength range. An additional object is to achieve this goal in the wavelength range which is used for optical communication.

In an embodiment, achromatic metasurfaces are provided on both the input and output face of the derotating optical element. The technical effect of this is, that the angle of deflection is the same for all wavelengths in a given wavelength range both at the input and output face of the derotating optical element. It is important for the transmission properties of the light that the angle of deflection is the same at both the input and output face, because only in this case all wavelengths of the given wavelength range will be imaged onto the same point, which is equivalent to saying that there will be no imaging errors.

According to one implementation, an optical rotary joint comprises a first collimator arrangement configured to couple light to first set of light waveguides, a second collimator arrangement configured to couple light to second set of light waveguides, at least one of these collimator arrangements being rotatable about a rotation axis with respect to another of these collimators (or, alternatively, both collimator arrangement are independently rotatable about the rotation axis). A derotating optical element is disposed in a light path between the first collimator arrangement and the second collimator arrangement. Here, a first face of the derotating optical element comprises a first multiwavelength achromatic metasurface and a second face of the derotating optical element comprises a second multiwavelength achromatic metasurface.

Figure 2:
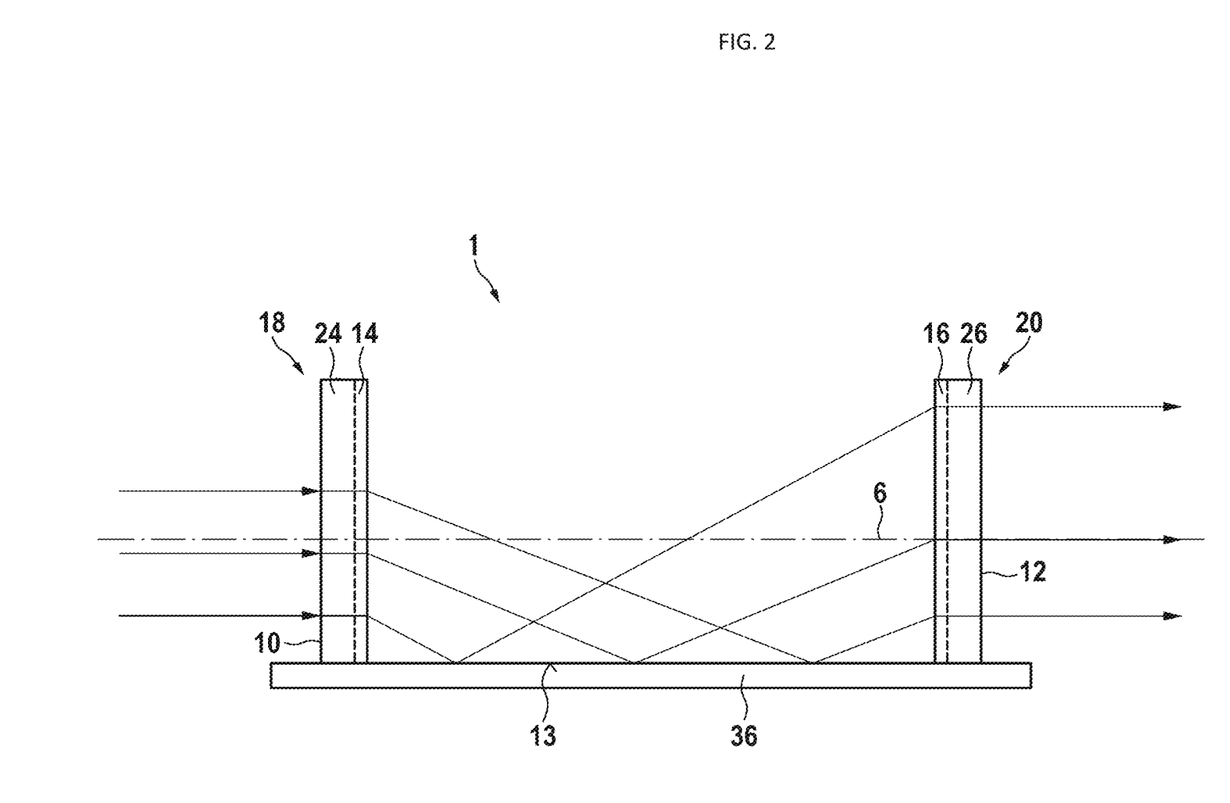
Figure 3:
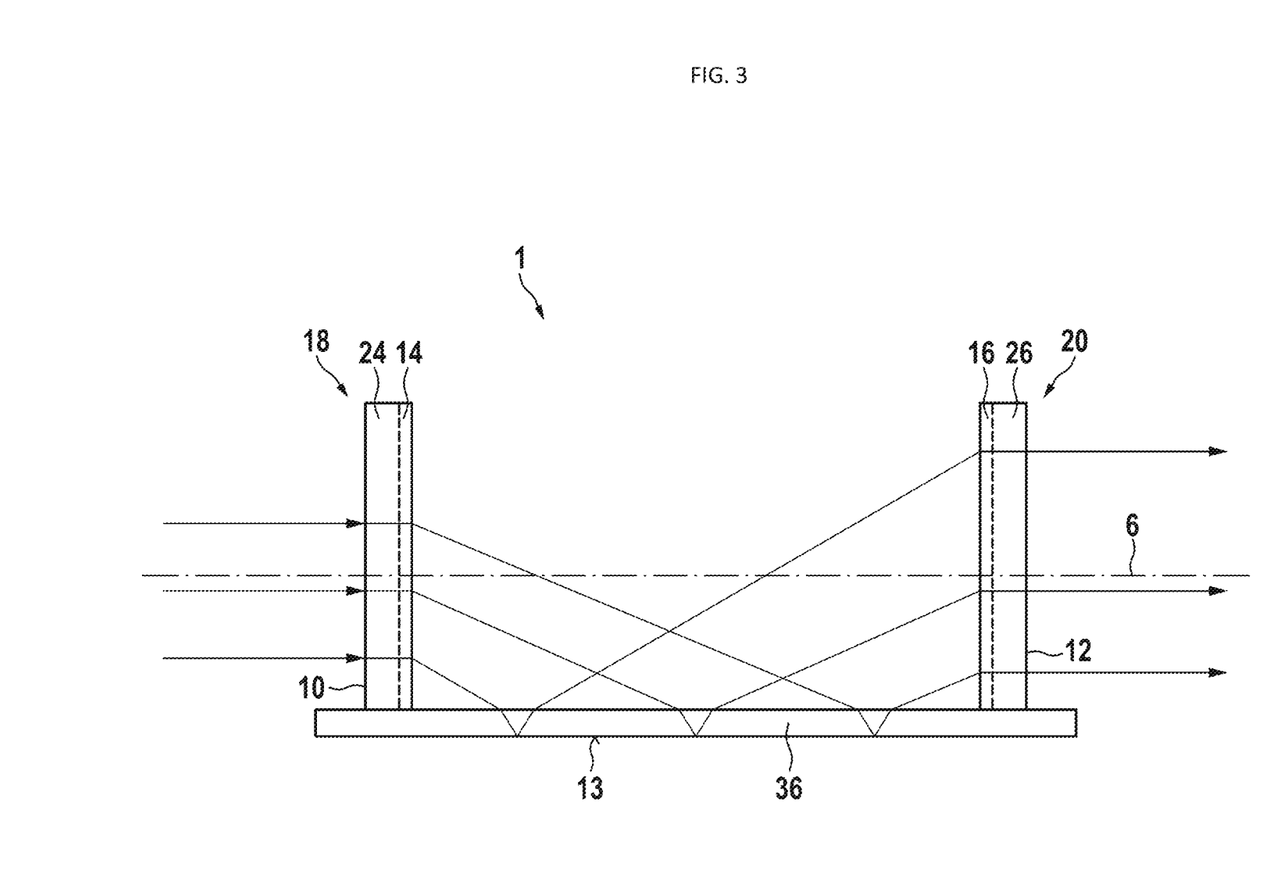
FIG. 3 shows a further embodiment of an optical rotary joint with a different optical path.

The derotating optical element preferably is a Dove prism, or an arrangement comprising a first and a second face which preferably has a reflecting surface being arranged in a light path between the first face and the second face. Such an arrangement is illustrated in FIGS. 2 and 3.

A plurality of light waveguides is coupled to each collimator arrangement. The optical rotary joint may be used bidirectional, which means that either light is coupled out of the light waveguides, from where it is sent to the derotating optical element or light coming from the derotating optical element is coupled to the light waveguides. Therefore, both the first and the second face can be used as an input or output face.

The term "face" (or term "facet" that may be used interchangeably with "face"), as mentioned in first and second faces or input and output faces, describes the area between different media having e.g. different indices of refraction. In particular the term face refers to both sides of such an area between two neighboring or adjacent media.

The derotating optical element is preferably rotated at half the angular speed of the relative rotational speed difference between the first collimator arrangement and the second collimator arrangement.

The term multiwavelength achromatic metasurface refers to a surface as described in the publication arXiv:1411.3966 [physics.optics] submitted on 14 Nov. 2014 to the e-print repository arXiv of Cornell University. Contents of this publication are incorporated by reference herein. I It is shown that a multiwavelength achromatic metasurface can be manufactured such that a multiwavelength achromatic metasurface deflects three different wavelengths about the same angle of deflection. Further, it is shown that a multiwavelength achromatic metasurface can function as a flat lens such that for three different wavelengths the focal length of this flat lens is the same.

Such a multiwavelength achromatic metasurface comprises a plurality of dielectric resonators which as a whole may deflect a plurality of wavelengths about a definite angle of deflection. This angle might be positive or negative. For example, a multiwavelength achromatic metasurface may be optimized for e.g. three different wavelengths within a given wavelength interval or range, such that these three different wavelengths are deflected about a given angle of deflection while the other wavelengths of this wavelength interval are deflected about different angles of deflection, which are within a given range which should be as small as possible for each setup. In general, the structure of such an achromatic metasurface is not periodic along the plane in which the light is deflected. Along the plane orthogonal to the just mentioned plane, the structure of such an achromatic metasurface is in general not changing.

The derotating optical element preferably further comprises a reflecting surface which is arranged in a light path between the first face and the second face.

The derotating optical element is preferably a Dove prism. A Dove prism is generally understood as a reflective type prism which may be used to invert an image. A Dove prism in general has an input face being arranged under an angle, generally called prism angle, with respect to the incident beam, the incident beam assumed to impinge parallel to a top and bottom face of the Dove prism. Further, the Dove prism has an output face which is symmetrical with respect to a plane being orthogonal to the incident beam. This means that the output face is arranged at the negative prism angle with respect to the incident beam. Between the input and output face, in general, there are two faces, i.e. a top and a bottom face, which are in general parallel to each other and parallel to the incident beam. In total the Dove prism is symmetric to a plane in the middle of the Dove prism which is orthogonal to the incident beam. When the Dove prism is rotated with respect to the incident beam, the transmitted image is rotated at twice the rate of the prism. Preferably, the light is reflected at the top and/or bottom face. This reflection may be a total internal reflection.

Preferably, the derotating optical element includes of a one-pieced prism body (that is a prism element, made of one, single, sole, the only, monolithic piece) between the first face and the second face. The advantage of the latter case is that the light after having entered the prism body and being reflected once at the top or bottom face, will impinge onto output face under the same angle as the refracted beam has towards the input face. This means that for parallel light impinging on the derotating optical element, the output beam will be parallel to the input beam.

Preferably, a first multiwavelength achromatic metasurface is arranged at the first face on the one-pieced prism body on a surface facing away from the second face, i.e. facing the incident beam. Preferably, another multiwavelength achromatic metasurface which preferably is symmetric to the first multiwavelength achromatic metasurface is arranged at the second face on the one-pieced prism body on a surface facing away from the first face, i.e. facing away from the incident beam. According to this embodiment, the multiwavelength achromatic metasurfaces are arranged on the surface of the one-pieced prism body.

According to another embodiment, instead of applying a plurality of dielectric resonators on the outer surface of the prism body, the outer surface of the prism body could be etched such that a plurality of dielectric resonators remain on the outer surface of the prism body. It is clear to the skilled person that the arrangement of the plurality of dielectric resonators might not be the same for both embodiments.

Preferably, the derotating optical element comprises a first and a second prism body between the first face and the second face, and a reflecting surface arranged between the two prism bodies. This arrangement has the advantage, that e.g. two compact, thin prism bodies could be used instead of a bulky one-pieced prism body. The reflecting surface is preferably parallel to the incident beam and could be arranged between the two prism bodies, in particular such that the reflecting surface abuts or touches both prism bodies.

Preferably, the first prism body comprises the first face and the second prism body comprises the second face. Preferably, the first multiwavelength achromatic metasurface is arranged on a surface of the first prism body facing the second face, and the second multiwavelength achromatic metasurface is arranged on a surface of the second prism body facing the first face. In other word, the multiwavelength achromatic metasurfaces are arranged on the inside, thus facing each other. According to another embodiment, the multiwavelength achromatic metasurface may face away from each other, i.e. they may be arranged on the outside. To achieve the same effect, the metasurfaces may be structured differently.

Preferably, the first prism body comprises a first substrate on which the first multiwavelength achromatic metasurface is arranged. Additionally or alternatively the second prism body comprises a second substrate on which the second multiwavelength achromatic metasurface is arranged. In the above mentioned embodiment where the multiwavelength achromatic metasurfaces are arranged on the inside, the substrate may be arranged on the outside, and in the above mentioned embodiment where the multiwavelength achromatic metasurfaces are arranged on the outside, the substrate may be arranged on the inside.

The thickness of the first or second substrate may be thin compared to normal lenses, it may e.g. be between 2 mm and 0.1 mm.

Preferably, the optical rotary joint is configured for light having a frequency spectrum between 1100 nm and 2000 nm. In particular light used for the optical rotary joint may be in the spectral band between 1260 nm and 1660 nm which is used for optical communication. The spectral band used for optical communication may e.g. be at/east one of the C-band (1528 to 1561), L-band (1561 to 1660), O-band (1260 to 1360), E-band (1360 to 1460), and S-band (1460 to 1528), the wavelengths ranges indicated in brackets in nanometers. Even more preferably, the three wavelengths 1310 nm, 1430 nm, and 1550 nm are used.

For a prior art Dove prism made from borosilicate glass BK7 having a prism angle of 45°, the resulting angles of refraction for the wavelengths 1310 nm, 1430 nm, and 1550 nm are 28.052552°, 28.082043°, and 28.112199°. The embodiments reduce this angle deviation. Preferably, the relative deviation is about 0.2%.

For parallel (collimated) light impinging onto the first or second achromatic metasurface, the angles of deflection for the refraction of light within a given wavelength range or interval is preferably a given value with a maximum deviation of 2%. For example, if the wavelengths lie within the band or spectral interval used for telecommunication, which e.g. is between 1100 nm and 2000, and there are three wavelengths (e.g. 1310 nm, 1430 nm, and 1550 nm) which are optimized for a given angle of deflection, e.g. 28.08°, then the maximum deviation for light at other wavelengths within this spectral interval should be 2% of 28.08° at maximum, which is about 0.56°. More preferably this deviation is 0.1%, which in this case is equivalent to 0.02808°. In that case, the angles of deflection for light at wavelengths between 1100 nm and 2000 nm should be between 28.10808° and 28.05192°. In different implementations, the above mentioned deviation is below 0.05%; below 0.02%; preferably below 0.01%; more preferably below 0.005%; below 0.002%, or even more preferably below 0.001%, depending on the implementation.

For parallel, collimated light impinging onto the first or second achromatic metasurface, the light refraction is preferably the same for all wavelengths in a given wavelength range or spectral interval. This is equivalent to saying that the above mentioned deviation vanishes.

Preferably, the first multiwavelength achromatic metasurface and the second multiwavelength achromatic metasurface comprise the same angle of deflection for incident beams having wavelengths of a given frequency spectrum.

Preferably, a multiwavelength achromatic metasurface as mentioned above comprises an arrangement of a plurality of subwavelength size resonators.

Preferably, the material from which at least one of the plurality of subwavelength size resonators is made, is glass or silicon.

The material of the first and/or second substrate is preferably fused silica. The material of the first and/or second substrate is preferably porous silica or an aerogel.

The subwavelength size resonators preferably have a width between 100 nm and 2000 nm, and/or a height between 100 nm and 1000 nm. Further the distance between neighboring subwavelength size resonators preferably lies between 100 nm and 3000 nm. The subwavelength size resonators preferably have a length between 1 mm and 30 mm. With this length, a compact lens may be built.

The shape or form of the subwavelength size resonators preferably is at least one of a prism, in particular having a rectangular base area or a triangular base area, a cuboid, a pad and plate. As these resonators may e.g. be made by processes used in microfabrication like e.g. etching, the above mentioned shapes may not be perfect, but only an approximation.

The plurality of subwavelength size resonators is preferably manufactured by etching, in particular dry-etching or reactive-ion etching, evaporative deposition, laser ablation, or attaching, in particular gluing, of a prefabricated component on a surface of the derotating optical element.

In the above mentioned case, that the subwavelength size resonators are arranged on top of the derotating optical element, the preferred manufacturing process is evaporative deposition. The derotating optical element may be a prism, in particular, a Dove prism. In that case, the subwavelength size resonators may be arranged on a prism body in case of a one-pieced prism body or on top of a substrate if the prism body has at least two prism bodies. In the latter case, the prism bodies may be thin.

According to another embodiment, the subwavelength size resonators may be manufactured indirectly by either etching away or ablating material beneath the resonators. This may be done on a substrate or a prism body. The process of etching may e.g. be dry etching, in particular reactive-ion etching as used in microfabrication. The process of ablation may e.g. be laser ablation, e.g. by using an excimer laser. The used laser may e.g. be an UV laser.

According to another embodiment, a prefabricated component may be attached, in particular glued on top of a substrate or a prism body. The prefabricated component may e.g. be a microstructured silicon wafer or plate.

The plurality of subwavelength size resonators may e.g. be applied by evaporative deposition onto the first and/or the second face of the derotating optical element, the first and/or the second face of the Dove prism, in particular onto the first and/or the second face of the one-pieced prism body of the Dove prism or onto the first face of the first prism body and/or onto the second face of the second prism body of the Dove prism. As the first and second prism bodies preferably comprise a first or second substrate, the plurality of subwavelength size resonators may preferably be applied onto the first and/or second substrate. In the resulting first or second prism body the side of the substrate could be used as the input or output face. In other word, as there is a reflecting surface between the first and second prism body, the substrate side of either the first or the second prism body could face towards the reflecting surface or could face away from the reflecting surface.

An angle between the first face and the reflecting surface and/or an angle between the second face and the reflecting surface is preferably between 15° and 90°. It is more preferred that the angle between the first face and the reflecting surface and/or the angle between the second face and the reflecting surface is an angle which is slightly deviating from 90°. In this case a back reflection is prevented, which increases the return loss. Preferably the angle between the first face and the reflecting surface and the angle between the second face and the reflecting surface is the same.

BRIEF DESCRIPTION OF THE DRAWINGS

In the following, the invention will be described by way of example, without limitation of the general inventive concept, on examples of embodiment and with reference to the drawings.

FIG. 2 shows another embodiment of an optical rotary joint with a derotating optical element comprising two prism bodies and a reflecting surface in between.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
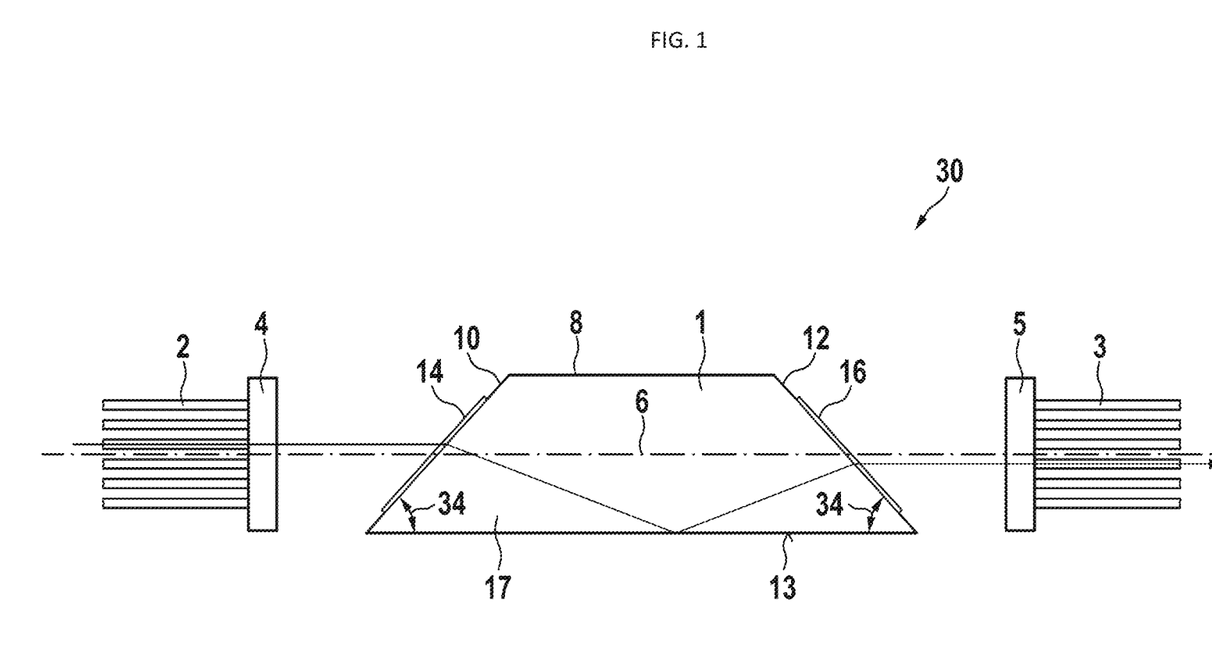
FIG. 1 shows an optical rotary joint according to a first embodiment with a one-pieced Dove prism as a derotating optical element.

FIG. 1 shows an optical rotary joint 30 having a first collimator arrangement 4 for coupling on first light waveguides 2 and a second collimator arrangement 5 for coupling on second light waveguides 3. A Dove prism 8 is arranged between the first collimator arrangement 4 and the second collimator arrangement 5 as a derotating optical element 1. The distance from the Dove prism 8 to the first collimator arrangement 4 is preferably the same as from the Dove prism 8 to the second collimator arrangement 5. As the optical rotary joint 30 may be working bidirectional, light may be coupled out of the first light waveguides 2 of the first collimator arrangement 4 through the Dove prism 8 and into the second light waveguides 3 of the second collimator arrangement 5 and vice versa. As said above, the Dove prism 8 is preferably rotated at half the angular speed of the relative rotational speed difference between the first collimator arrangement and the second collimator arrangement. The axis for this rotation is rotation axis 6 as depicted in FIG. 1.

The Dove prism 8 comprises a first face 10, a second face 12, and a reflecting surface 13 which is arranged between the first face 10 and the second face 12. The reflecting surface 13 is a base face of the Dove prism 8 and is parallel to both first light waveguides 2 and the second light waveguides 3. The Dove prism 8 comprises a one-pieced prism body 17.

The first face 10 has a first multiwavelength achromatic surface 14 on its outer surface. The second face 12 has a second multiwavelength achromatic surface 16 on its outer surface. The angle between the first face 10 and the reflecting surface 13 and the angle between the second face 12 and the reflecting surface 13 is preferably the same angle, which is called the prism angle 34.

The first multiwavelength achromatic surface 14 on the first face 10 and the second multiwavelength achromatic surface 16 on the second face 12 are preferably symmetric with respect to a plane in the middle between the first face 10 and the second face 12.

Multiwavelength light emerging from the first collimator arrangement 4 and impinging onto the first face 10 will preferably be deflected about the same angle of deflection. Therefore, this light will be reflected at the reflecting surface 13 at the same point along the longitudinal direction of the Dove prism 8. After reflection the light will impinge on the second face 12. As the angle between the reflected light and the second face 12 is the same as the angle between the light refracted by the first face 10 and the first face 10, the refracted reflected light will be parallel to the light which impinged on the Dove prism 8.

In FIG. 2 another preferred embodiment is shown. FIG. 2 shows a derotating optical element 1 which comprises two prism bodies, i.e. a first prism body 18 and a second prism body 20. Both the first prism body 18 and the second prism body 20 are essentially thin and flat plates which are arranged aligning with respect to a horizontal line of the drawing plane. On a bottom side of both the first prism body 18 and the second prism body 20, a thin optical plate 36 is arranged. In the embodiment of FIG. 2, the thin optical plate 36 has a reflecting surface 13 on the top side of the thin optical plate 36. The first prism body 18, the second prism body 20 and the thin optical plate 36 may be mechanically connected to each other.

The first prism body 18 comprises a first substrate 24 on which a first multiwavelength achromatic surface 14 is arranged. The second prism body 20 comprises a second substrate 26 on which a second multiwavelength achromatic surface 16 is arranged.

The first multiwavelength achromatic surface 14 of the first prism body 18 faces the second multiwavelength achromatic surface 16 of the second prism body 20. Phrased differently the multiwavelength achromatic surfaces 14, 16 of the derotating optical element 1 of FIG. 2 are arranged on the inside while the substrates 24, 26 are arranged on the outside. According to another embodiment, the multiwavelength achromatic surfaces 14, 16 may be arranged on the outside while the substrates 24, 26 are arranged on the inside.

Like the Dove prism 8 of FIG. 1, the derotating optical element 1 of the embodiment of FIG. 2 has a rotation axis 6.

Light emerging from first light waveguides of the first collimator arrangement will first impinge orthogonally on the substrate 24 of the first prism body 18 where it will not be deflected. This light is illustrated in FIG. 2 as three light beams 38, 40, 42. Other light beams are possible and not illustrated in FIG. 2. Then this light will enter the first multiwavelength achromatic surface 14 where it will be deflected according to the aperiodic distribution of the dielectric resonators. The resonators of the first multiwavelength achromatic surface 14 of the derotating optical element 1 of the embodiment of FIG. 2 are arranged such that the light will be deflected towards the reflecting surface 13. The angle of deflection in this case is the same for all light rays independent on which vertical position the light impinges on the first multiwavelength achromatic surface 14. After the deflection, the light will be reflected by the reflecting surface 13 of the optical thin optical plate 36 without penetrating this thin optical plate 36. The reflecting surface 13 may be realized by a specific optical coating on top of the thin optical plate 36. This optical coating may e.g. a broadband dielectric mirror coating or a metallic mirror coating etc.

After reflection from the reflecting surface 13 of the thin optical plate 36, the light will hit the second multiwavelength achromatic surface 16 of the second prism body 20. For the reflection at the reflecting surface 13 of the thin optical plate 36, the angle of incidence equals the angle of reflection. Therefore, the angle of the light impinging onto the second multiwavelength achromatic surface 16 of the second prism body 20 equals the angle between the light refracted by the first multiwavelength achromatic surface 14 and the first multiwavelength achromatic surface 14. Hence, the light refracted by the second multiwavelength achromatic surface 16 will be parallel to the light impinging onto the first prism body 18. After refraction of the light by the second multiwavelength achromatic surface 16, the light will cross the substrate 26 and then leave the second prism body 20.

In FIG. 3 another preferred embodiment is shown. The difference to the embodiment of FIG. 2 is that the light is not reflected at the top side of thin optical plate 36 but at its bottom rear side, i.e. the reflecting surface 13 is not at the top side but at the bottom side. This may be realized by total internal reflection at the boundary surface between the medium of the thin optical plate 36 and the outside medium, which may e.g. be air. Compared to the embodiment of FIG. 2, each ray which is reflected at the reflecting surface 13 has a slight displacement towards the second prism body 20. The angles in FIG. 2 or 3 are not to scale. Preferably, the top side of thin optical plate 36 comprises an antireflection (AR) coating.

Figure 4:
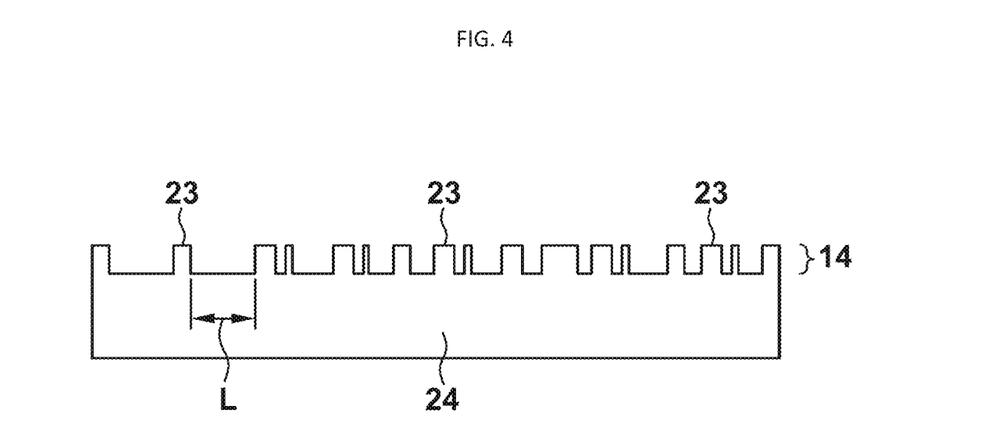
FIG. 4 shows a cross sectional view of a multiwavelength achromatic metasurface.
Figure 5:
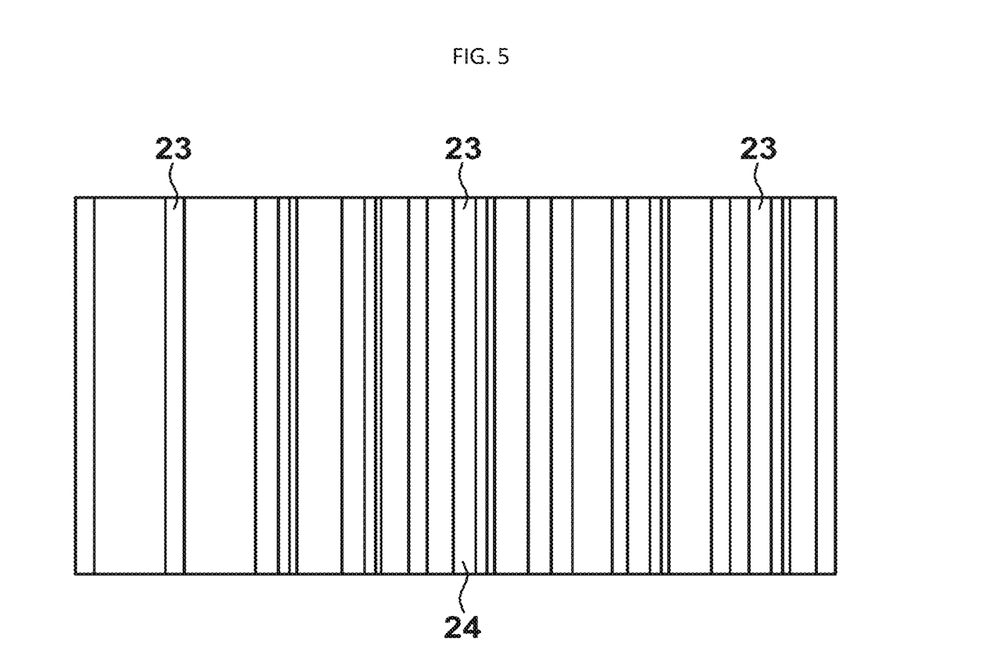
FIG. 5 shows a top view of a multiwavelength achromatic metasurface.

FIGS. 4 and 5 show a first multiwavelength achromatic surface 14 as used on a derotating optical element 1, in particular a Dove prism 8. A second multiwavelength achromatic surface 16 may have the same structure as the first multiwavelength achromatic surface 14 shown in FIGS. 4 and 5.

FIG. 4 shows a cross sectional view of a first multiwavelength achromatic surface 14 which is arranged on top of a substrate 24. The first multiwavelength achromatic surface 14 comprises a plurality of resonators 23 which have a common height but different widths. Each resonator 23 may have a different width and the arrangement of the resonators 23 along the length of the substrate may be aperiodic. The length L indicated in FIG. 4 may e.g. be 1 micrometer.

FIG. 5 shows a top view of the embodiment of FIG. 4. It is shown that the length of the substrate 24 and the length of each resonator 23 is the same. According to different embodiments, the length of the substrate 24 may be larger than the length of the resonators 23.

Figure 6:
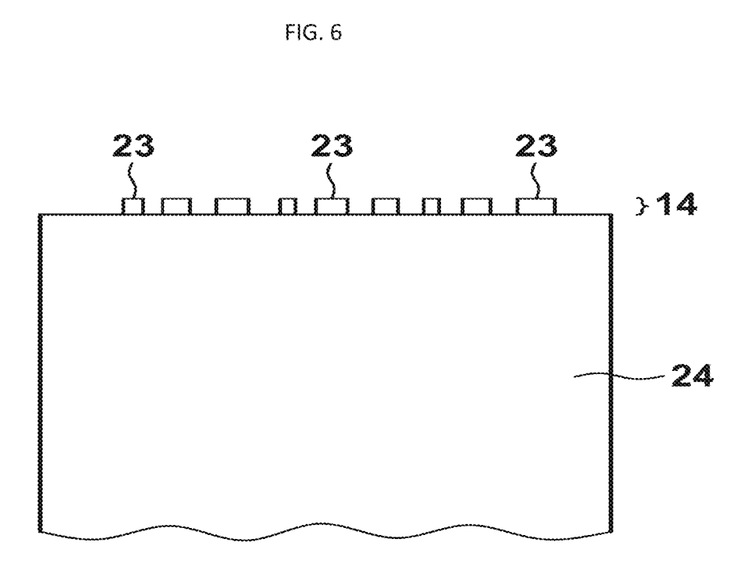
FIG. 6 illustrates manufacturing of multiwavelength achromatic metasurfaces by evaporative deposition.
Figure 7:
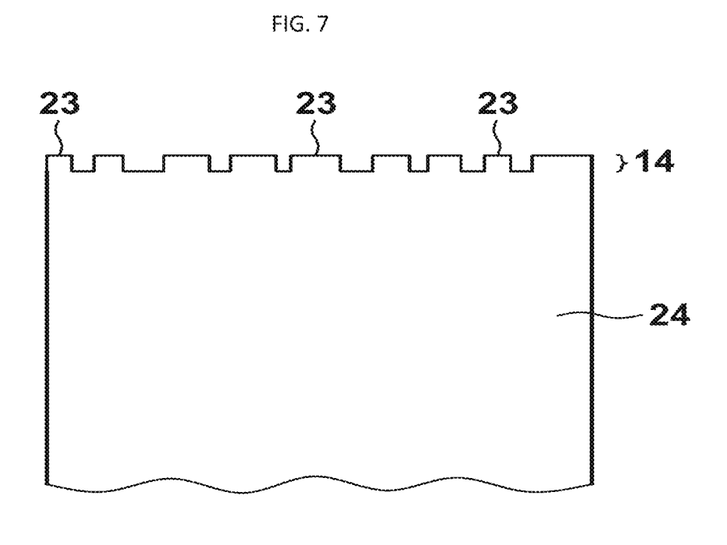
FIG. 7 illustrates manufacturing of multiwavelength achromatic metasurfaces by removing certain parts of a substrate.
Figure 8:
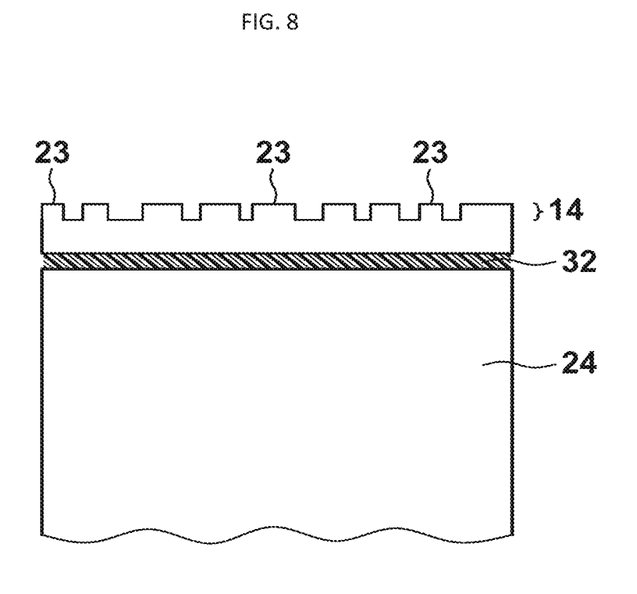
FIG. 8 illustrates manufacturing of multiwavelength achromatic metasurfaces by attaching a prefabricated component on a substrate.

FIGS. 6 to 8 illustrate different methods to manufacture the first multiwavelength achromatic surface 14 of the embodiment of FIG. 4 or 5.

FIG. 6 illustrates that the resonators 23 arranged on top of a substrate 24 may be applied on the substrate 24 by evaporative deposition.

FIG. 7 illustrates that the resonators 23 are manufactures by removing certain parts of a substrate 24 such that the remaining parts are the dielectric resonators 23 which are used the constituting parts of e.g. the multiwavelength achromatic surface 14. The removing of the certain parts of the substrate 24 may be done by etching, in particular dry-etching or reactive-ion etching, the substrate 24. Alternatively removing of the certain parts of the substrate 24 may be done by laser ablation.

FIG. 8 illustrates that the multiwavelength achromatic surface 14 may also be applied on top of a substrate 24 by attaching, in particular gluing, a prefabricated component on the substrate 24. The multiwavelength achromatic surface 14 may be glued on the substrate 24 by using a layer of glue 32.

In FIGS. 6 to 8, the substrate 24 may e.g. be a derotating optical element 1, in particular a Dove prism 8. Therefore, the substrate 24 may be a prism body 17, in particular a first or second prism body 18, 20, or a first or second face 10, 12 of a Dove prism 8.

It will be appreciated to those skilled in the art having the benefit of this disclosure that this invention is believed to provide an optical rotary joint. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 derotating optical element
2 first light-waveguides
3 second light-waveguides
4 first collimator arrangement
5 second collimator arrangement
6 rotation axis
8 Dove prism
10 first face
12 second face
13 reflecting surface
14 first multiwavelength achromatic surface
16 second multiwavelength achromatic surface
17 prism body
18 first prism body
20 second prism body
22 arrangement of subwavelength size resonators
23 resonator
24 first substrate
26 second substrate
30 optical rotary joint
32 glue
34 prism angle
36 thin optical plate
38, 40, 42 light beam

The invention claimed is:

1. An optical rotary joint comprising:
a first light collimator connected to first light waveguides,
a second light collimator connected to second light waveguides, the second collimator arrangement being arranged rotatably relative to the first collimator arrangement about a rotation axis, and
a derotating optical element in a light path between the first light collimator and the second light collimator,
wherein
a first face of the derotating optical element comprises a first multiwavelength achromatic metasurface, and
a second face of the derotating optical element comprises a second multiwavelength achromatic metasurface.

2. The optical rotary joint according to claim 1, wherein the first and second multiwavelength achromatic metasurfaces comprise a plurality of subwavelength size resonators, configured such that light entering the first multiwavelength achromatic surface is deflected according to an aperiodic distribution of resonators from said plurality.

3. The optical rotary joint according to claim 2, wherein the derotating optical element further comprises a reflecting surface disposed in a light path between the first face and the second face.

4. The optical rotary joint according to claim 3, wherein at least one of a first angle between the first face and the reflecting surface and a second angle between the second face and the reflecting surface is between 15° and 90°.

5. The optical rotary joint according to claim 4, wherein at least one of the first and second angles is 90 degrees.

6. The optical rotary joint according to claim 1, wherein the derotating optical element is a Dove prism.

7. The optical rotary joint according to claim 1, wherein the derotating optical element comprises a one-pieced prism body between the first face and the second face.

8. The optical rotary joint according to claim 7, wherein the first multiwavelength achromatic metasurface is arranged at the first face on the one-pieced prism body on a surface facing away from the second face, and the second multiwavelength achromatic metasurface is arranged at the second face on the one-pieced prism body on a surface facing away from the first face.

9. The optical rotary joint according to claim 1, wherein the derotating optical element comprises first and second prism bodies between the first face and the second face, and
a reflecting surface arranged between the first and second prism bodies.

10. The optical rotary joint according to claim 9, wherein the first prism body comprises the first face and the second prism body comprises the second face; and
the first multiwavelength achromatic metasurface is arranged on a surface of the first prism body facing the second face; and
the second multiwavelength achromatic metasurface is arranged on a surface of the second prism body facing the first face.

11. The optical rotary joint according to claim 9, wherein at least one of following conditions is satisfied:
   (i) the first prism body comprises a first substrate on which the first multiwavelength achromatic metasurface is arranged, and
   (ii) the second prism body comprises a second substrate on which the second multiwavelength achromatic metasurface is arranged.

12. The optical rotary joint according to claim 1, wherein said rotary joint is configured to operate at any wavelength of an optical frequency spectrum between 1100 nm and 2000 nm.

13. The optical rotary joint according to claim 2, wherein a material of the plurality of subwavelength size resonators includes one or more of glass and silicon.

14. The optical rotary joint according to claim 2, wherein a subwavelength size resonator from the plurality has a width between 100 nm and 2000 nm, and a height between 100 nm and 1000 nm; and
the distance between neighboring subwavelength size resonators from the plurality is between 100 nm and 3000 nm.

15. The optical rotary joint according to claim 2, wherein a subwavelength size resonator from said plurality has a shape of any of (i) a prism having a rectangular base or a triangular base, (ii) a cuboid, (iii) a pad; and (iv) a plate.

16. A method, comprising:
forming, on a face of a derotating optical element, a multiwavelength achromatic metasurface; and
assembling an optical rotary joint that contains said derotating optical element.

17. The method according to claim 16, wherein the forming includes forming said metasurface that contains a plurality of subwavelength size resonators.

18. The method according to claim 17, wherein the forming includes manufacturing said plurality by at least one of (i) dry-etching, (ii) reactive-ion etching, (ii) evaporative deposition, (iii) laser ablation, and (iv) attaching, to said face, a prefabricated resonator-containing component.

19. The method according to claim 16, wherein the assembling includes disposing said optical rotary joint between first and second light collimators, each of which collimators is connected to a corresponding one of first and second set of light waveguides.

* * * * *

UNITED STATES PATENT AND TRADEMARK OFFICE
CERTIFICATE OF CORRECTION

PATENT NO.       : 9,804,335 B2
APPLICATION NO.  : 15/373962
DATED            : October 31, 2017
INVENTOR(S)      : Gregor Popp Page 1 of 1

It is certified that error appears in the above-identified patent and that said Letters Patent is hereby corrected as shown below:

In the Claims

Claim 1, Line 31, "guides, the second collimator arrangement being" should read --guides, the second light collimator being--

Claim 1, Line 32, "arranged rotatably relative to the first collimator" should read --arranged rotatably relative to the first light collimator--

Claim 1, Line 33, "arrangement about a rotation axis, and" should read --about a rotation axis, and--

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*